United States Patent [19]

Cornier

[11] Patent Number: 5,308,652

[45] Date of Patent: May 3, 1994

[54] PROCESS FOR TREATING LEAD GLASS TO FORM A LEAD DIFFUSION BARRIER IN THE SURFACE THEREOF

[75] Inventor: Gérard Cornier, Sainte Marguerite, France

[73] Assignee: Compagnie Des Cristalleries de Baccarat, Baccarat, France

[21] Appl. No.: 40,639

[22] Filed: Mar. 31, 1993

Related U.S. Application Data

[60] Continuation-in-part of Ser. No. 775,202, Oct. 11, 1991, Pat. No. 5,232,753, which is a division of Ser. No. 696,016, May 6, 1991, abandoned.

[30] Foreign Application Priority Data

May 23, 1990 [EP]  European Pat. Off. ........ 90440046.2

[51] Int. Cl.$^5$ ............................. C03C 3/15; B05D 3/02
[52] U.S. Cl. ..................................... 427/600; 427/230; 427/374.7; 427/376.2; 427/377.8; 501/60; 501/74
[58] Field of Search ............... 427/600, 230, 374.7, 427/376.2, 377.8; 501/60, 74; 51/319, 317, 383 R; 65/60.57

[56] References Cited

PUBLICATIONS

Metsen et al., "Suppression of Molecular Ions in the Secondary Ion Mass Spectra of Minerals," *Surf. Interf. Anal.*, 181–185 (1988).
Muir et al, "Characteristics of Altered Labradorite Surfaces by SIMS and XPS," *Geochim. Cosmochim. Acta*, 53, 1235–1241 (1989).

*Primary Examiner*—Shrive Beck
*Assistant Examiner*—Benjamin L. Utech
*Attorney, Agent, or Firm*—Fulwider, Patton, Lee & Utecht

[57] ABSTRACT

Articles formed of lead glass or crystal are treated in order to minimize the tendency for the article to leach lead or other heavy metals into products, such as alcohols or acidic foods, placed in contact therewith. In a preferred embodiment, flasks formed of glass containing between about 12% and 40% by weight lead oxide are provided with a thin layer or slip of kaolin, and heated at a temperature and for a time sufficient to exchange lead ions in the flask with ions other than lead in the kaolin layer. Preferably, the layer is applied as a thixotropic barbotin (slip) of pure hydrated aluminum silicate, and coated flasks are exposed to a temperature of between about 300° C. and the strain point of the glass forming the flask and for a time ranging between about 3 and about 6 hours; rapid heating and cooling is avoided. Following the heating step, the resulting silico-aluminous crust on the surface is removed to leave a silico-aluminous diffusion barrier in the treated surface of the flask which opposes migration or drift of lead ions in the flask into a product, such as an alcohol or food, placed into contact with the treated ("cemented") surface.

15 Claims, 3 Drawing Sheets

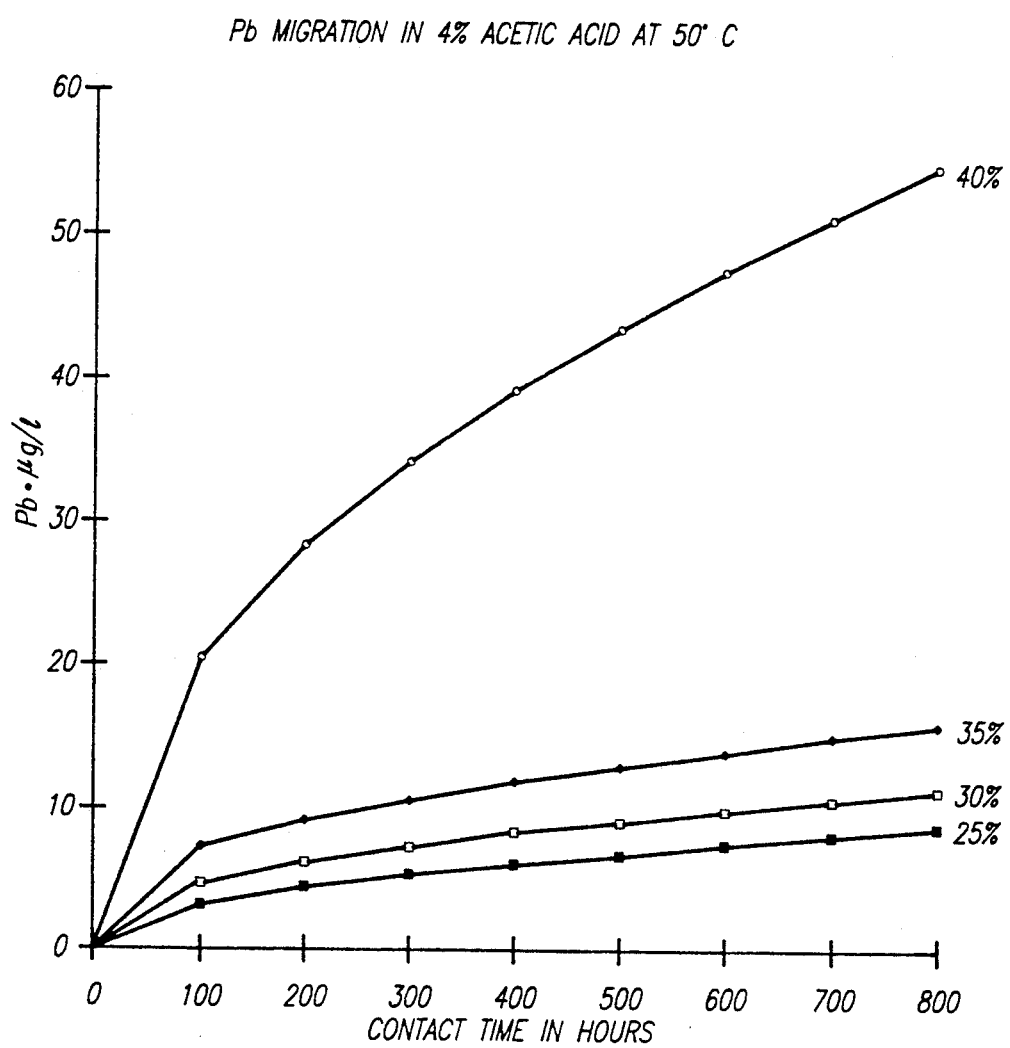

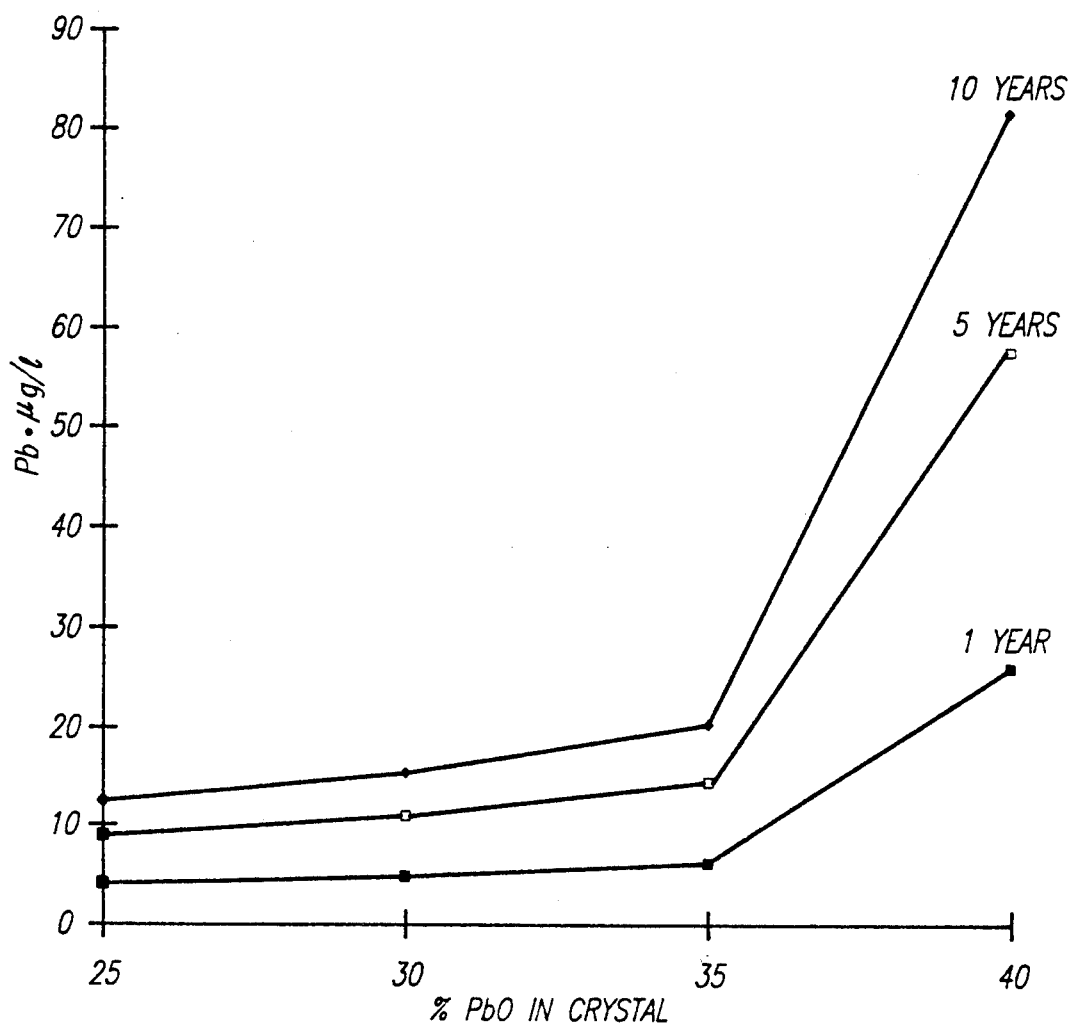

PROCESS FOR TREATING LEAD GLASS TO FORM A LEAD DIFFUSION BARRIER IN THE SURFACE THEREOF

This is a continuation-in-part of U.S. Pat. application Ser. No. 07/775,202, filed Oct. 11, 1991, now U.S. Pat. No. 5,232,753 which is a divisional application of U.S. Pat. application Ser. No. 07/696,016, filed May 6, 1991 now abandoned.

FIELD OF THE INVENTION

The present invention is directed to articles formed of crystal or lead glass having a reduced tendency to leach lead or other heavy metals into materials coming into contact with the surfaces thereof, and is directed to a process for treating the surface of articles made of crystal or lead containing glass in order to prevent metals, such as lead, from migrating into materials contacting the glass.

BACKGROUND OF THE INVENTION

Articles made of vitreous materials which contain heavy metals, such as lead, barium, cadmium, etc., are desirable for their attractive appearance. Frequently, high quality foods and beverages are sold and stored in decanters formed of crystal or a lead-containing glass. As used herein, a lead containing glass means a glass containing lead oxide, PbO, and unless otherwise indicated, percent PbO or percent lead indicate weight percent PbO. For a lead glass to be classified as crystal, it must contain at least 24% by weight lead oxide, and preferably contains at least 30% lead oxide. (See Norme Francaise, NF B 30-004, December 1971, established by the Association Francaise De Normalization, AFNOR. Glass having greater than 24% PbO w/w is classified as "cristal au plomb," and glass having greater than 30% PbO is classified as "cristal superieur.")

Articles formed of crystal are desirable because of the pleasing aesthetic appearance which the lead in the glass lends to the article. Frequently, crystal or lead glass flasks are used to store high quality alcohols, such as cognac, whisky, and wines, as well as fruit juices and aggressive, pasty products, such as mustards and other acid containing foodstuffs (as used herein, the term liquid refers to both pastes and liquids). It is well-known that any liquid stored in a container or receptacle has a tendency to dissolve some quantity of the chemical constituents of the materials forming the container. The quantity of material forming the container which is dissolved or leached into the liquid stored in the container is generally extremely low. For example, water stored in a container of sodocalcic glass will solubilize some $Na_2O$ from the glass. Standard tests (e.g., Deutsche Industrie Normon, DIN, 12111, January, 1962) are available which provide a comparison of the hydrolytic resistance of sodocalcic glasses (water will dissolve 30 to 1000 $\mu$g $Na_2O$ per gram of glass exposed thereto for a duration of 1 hour at 90° C.).

The general phenomenon of leaching of container materials into liquids stored in the container is often considered to be of significance in analytical chemistry and in academic research, but this leaching tendency is generally not considered significant in everyday use. However, when materials, such as spirits and acid foodstuffs, are stored in articles made of vitreous materials containing heavy metals, there is a tendency for some heavy metals, such as lead, barium, and/or cadmium to migrate or leach into the foodstuffs stored in the container. Even a material having a relatively moderate acidic pH (e.g., pH=3.5) will leach a substantial amount of lead in a relatively short time period, and leaching will increase with time.

In fact, serious studies have led to international regulation standards "in order to ensure the protection of the population against possible dangers due to the contact between foodstuffs with the surface of articles made of glass used for the preparation, the service and the conservation of foods and beverages" (See International Standard ISO 7086/1-1982, established by the International Organization For Standardization, ISO, Geneva, Switzerland).

In particular, higher quality spirits are stored in crystal flasks containing a high percentage of lead oxide. In some countries, the health control authorities have strongly recommended a maximum lead content for alcoholic beverages, which has an impact on the producers of crystal flasks used for high value alcohol storage. Since high value spirits are often stored in crystal flasks containing a high percentage of lead, and since these spirits are stored for long periods of time in such flasks, a substantial amount of lead can leach or migrate into the alcohol which is ultimately consumed. For example, in the United States, the state of California, Safe Drinking Water and Toxics Enforcement Act of 1986 (known as Proposition 65) requires warning labels on lead glass containers if they are susceptible to leaching unsafe quantities of lead into food and/or beverages stored therein.

Applicant has disclosed in U.S. Pat. Nos. 4,981,733 and 4,983,199 that the problem of metal leaching can be solved by forming a crystal container which has on its internal surface a thin and continuous film made of unleaded glass; this thin layer of unleaded or low lead glass forms a screen against leaching or migration of heavy metals from the crystal into any product or drink stored in the container. The process for forming these metal-leaching-safe crystal flasks, involves (1) gathering a quantity of flowable unleaded glass into a drop shape; (2) gathering a parison of crystal over the aforesaid unleaded glass so as to cover the unleaded glass (the unleaded glass and crystal having similar coefficients of expansion and indices of refraction); and (3) blowing the crystal and unleaded glass together to form a desired container configuration, which has a cavity with an internal surface covered with a continuous film of unleaded glass.

While the foregoing solution allows for the safe storage of spirits and acid containing materials in a lead glass or crystal container, it is difficult to carry out the foregoing process and difficult to ensure that a continuous film of unleaded glass is provided on the surfaces of the resulting article that will come in contact with stored materials. It is also difficult to produce a thin and continuous unleaded glass layer on the interior surface of a lead glass flask. Using the existing processes, if one tries to produce too thin an unleaded glass layer on a leaded glass, the layer may not be continuous, and will therefore leach lead into materials contacting the incompletely coated layer.

Therefore, it is desired to produce crystal or leaded glass articles having an internal surface which can come into contact with acid containing materials or alcohols and leach only a minimal quantity of heavy metal into said materials. It is also desired to produce lead glass containers which have minimal lead leaching characteristics by a new and simplified process.

Therefore, it is an object of the present invention to produce an article of crystal or lead glass which prevents migration of the lead contained in the crystal or lead glass into an acid product contained in the article.

It is a further object of the present invention to produce an article made of crystal or lead glass having a continuous, thin layer on the surfaces of said article which come into contact with materials stored in said container, said layer being capable of minimizing or reducing the migration of lead from said crystal into the material stored in the container.

It is yet another object of the present invention to produce an article of crystal or lead glass which prevents migration of the lead contained in said crystal or lead glass into an acid product or alcohol contained in said article by a simple process.

SUMMARY OF THE INVENTION

These and other objects of the present invention are achieved by producing an article of crystal or lead glass, in which the surface which comes into contact with materials stored in the flask is provided with a thin and continuous silico-aluminous diffusion barrier (i.e., a silica and alumina-based glass film formed in the flack wall which acts as an effective barrier against diffusion). The silico-aluminous diffusion barrier is formed by treating the surface of the flask which will come in contact with materials stored in the flask so as to decrease the concentration of lead in the superficial region at and below the surface of the article. In a preferred embodiment, a silico-alumina-based glass film is formed by ion exchange in a crystal or lead glass flask interior surface (i.e., the surface which is to be in contact with the material stored in the flask). More specifically, lead and alkaline metal cations contained in the crystal or lead glass are exchanged for $H^+$ and $Al^{3+}$ cations, which are contained in a material brought into contact with the crystal under specific ion exchange conditions.

In a preferred embodiment, a material is placed in contact with the surface of an article formed of a lead containing glass or crystal under conditions which enable the exchange of lead ions in the material forming the article with ions in the material placed in contact with the article. Preferably, a coating ("slip" or "barbotin") containing hydrated aluminum silicate is formed on the surface of an article formed of crystal or lead containing glass, and heated at a temperature and for a period of time sufficient to remove lead from the superficial portion of the article surface. (This process may be referred to as "cementing," and flasks treated by cementing may be referred to as "cemented flasks.) By partially removing the lead ions contained in the surface of an article formed of lead containing glass or crystal, a thin layer (referred to herein as "a silico-aluminous diffusion barrier") is formed in the surface and superficial thickness or region therebelow having a reduced lead concentration. This layer or barrier hinders or reduces the migration or leaching of the remaining lead ions from the material forming the article into a product placed into contact with the thus treated surface.

In one embodiment, flasks formed of a material containing between about 12% and about 40% PbO by weight are treated as follows:

(a) a thin layer of hydrated aluminum silicate (or other material capable of exchanging ions other than lead therein for lead ions in a glass with which it is contacted at elevated temperatures) is applied to a lead glass flask;

(b) the flask is heated at a temperature between about 300° C. up to about but below the strain point of the glass forming the flask for a period of time (preferably about three to about six hours) sufficient to alter the surface of the flask so that the flask will not leach dangerous amounts of lead into materials placed in contact with the treated surface. (By "dangerous amounts of lead," it is meant that alcohols or foods placed in contact for five years with the surfaces of treated or cemented flasks formed of glass containing between about 12% and about 40% by weight lead will not leach more than 50 µg/l lead from the flasks.)

In a preferred embodiment, flasks formed of lead glass having between about 12% and about 35% by weight PbO, which would ordinarily require labeling under California's Proposition 65, are treated with the process of the present invention so that the resulting flasks will not require labeling.

Thus, the present invention includes a process for treating the surface of an article made of a lead containing glass, comprising the step of forming a silico-aluminous layer in at least one surface of said article, wherein said silico-aluminous layer reduces, in comparison to said glass without said layer, migration of lead ions from said glass into a liquid placed in contact with said surface having said silico-aluminous layer, said liquid being capable of solubilizing lead from said glass.

The step of forming said silico-aluminous layer comprises the steps of:

(a) applying to at least one surface of said article a thixotropic slip capable of exchanging lead ions in said glass with ions other than lead in said slip; and (b) heating said article with said slip thereon to a temperature and for a period of time sufficient to exchange at least a portion of said lead ions in said glass with ions other than lead in said slip.

In one embodiment of the foregoing process, the temperature is between about 300° C. and up to about but below the strain point of said glass, and said period of time is between about 3 hours and about 6 hours; preferably, the temperature is about 400° C. to about 440° C., and said period of time ranges from about 3 hours to about 6 hours.

The slip can be formed from a thixotropic suspension of hydrated aluminum silicate or kaolin.

Preferably, the slip discussed above is applied by filling said article with a thixotropic aqueous suspension of hydrated aluminum silicate, and emptying said article, wherein at least a portion of said thixotropic suspension adheres to the interior surface of said article to create said slip.

Preferably, the process described above includes the steps of:

(c) cooling said article having said slip thereon after said heating step; and (d) removing the silico-aluminous lead containing crust formed from said slip as a result of said heating step, said removing step being performed by at least one of the methods selected from the group comprised of washing with a solution comprising water; sand blasting; and ultra-sound treatment. Further, the glass comprises at least about 12% by weight lead oxide and preferably between about 24% and 35% by weight lead oxide, and the silico-aluminous layer formed in said glass has a thickness of at least 20 nanometers, preferably about 100 nanometers.

In one aspect, the present invention includes a process for removing lead from the surface of an article made of a lead containing glass, comprising contacting said article with a thixotropic slip capable of exchanging lead ions in said glass with ions other than lead from said slip; and heating said article with said slip thereon to a temperature between 300° C. and the strain point or temperature of said glass for a period of time sufficient to exchange at least a portion of said lead in said glass with said ions other than lead in said slip. The slip can be formed from a thixotropic aqueous suspension of hydrated aluminum silicate or kaolin.

Preferably, the article having said slip thereon is heated at progressively elevated temperatures of up to about 400° C. to about 440° C. for periods of time ranging from about 4 hours to about 6 hours.

In another aspect, the present invention includes a process for reducing migration of lead into substances stored in a container formed of a lead containing glass, said substances being capable of leaching lead from said lead glass when contacted therewith, comprising the step of, prior to placing said substances in said container, forming a silico-aluminous layer in the surface or surfaces of said container which will contact said substances.

In yet another aspect, the present invention includes a process for storing a substance in a container formed of lead containing glass, said substance being capable of solubilizing lead from said glass, comprising the step of placing said substance in a container formed of a lead containing glass, said container having a silico-aluminous layer in at least the interior surface thereof which contacts said substance, wherein said substance can solubilize less lead from said layer than can be solubilized from said lead containing glass without said layer, and wherein said substance is selected from the group comprised of alcoholic beverages, fruit juices, and vinegar containing preparations.

The present invention also is directed to an article, comprising a container formed of a lead containing glass, said container having at least one wall having inner and outer surfaces, wherein at least said inner surface has a silico-aluminous layer, wherein less lead leaches into an acidic solution stored in a flask having said layer than would be leached into said acidic solution stored in said flask without said layer. The layer can have a thickness of about 100 nanometers, and preferably said glass comprises about 24% to about 35% lead oxide by weight and said layer comprises less lead than said glass.

In a preferred embodiment, the present invention includes an article, comprising a container formed of a lead containing glass, said glass comprising at least about 12% by weight lead oxide, said container having at least one wall defining a cavity having an inner surface, said inner surface having a silico-aluminous diffusion barrier, wherein, an alcoholic beverage having a pH of about 3.5 stored in said cavity for a period of 5 years at a temperature of 20° C. will leach less than 50 micrograms per liter of lead from said container.

Lead glass flasks produced in accordance with the present invention are suitable for storage of alcohols, such as cognac, whisky, and wines, or fruit juices and acid foodstuffs, and will not permit leaching of unsafe amounts of lead into the products contained therein for at least 5 years. Crystal flasks containing between 24 and 35% lead oxide by weight, after treatment with the process of the present invention, will not leach more than 50 micrograms per liter lead into commercially available spirits stored therein for at least 10 years.

DESCRIPTION OF THE DRAWINGS

solutions of 4% acetic acid at 50° C. over time stored in flasks of varying lead concentrations in accordance with the present invention; and FIG. 3 is a chart of the projected amount of lead migration into a solution of 4% acetic acid stored in crystal flasks produced of varying lead concentrations in accordance with the present invention; the migration of lead is projected for durations of 1 year, 5 years, and 10 years.

DETAILED DESCRIPTION OF THE INVENTION

Figure 1:
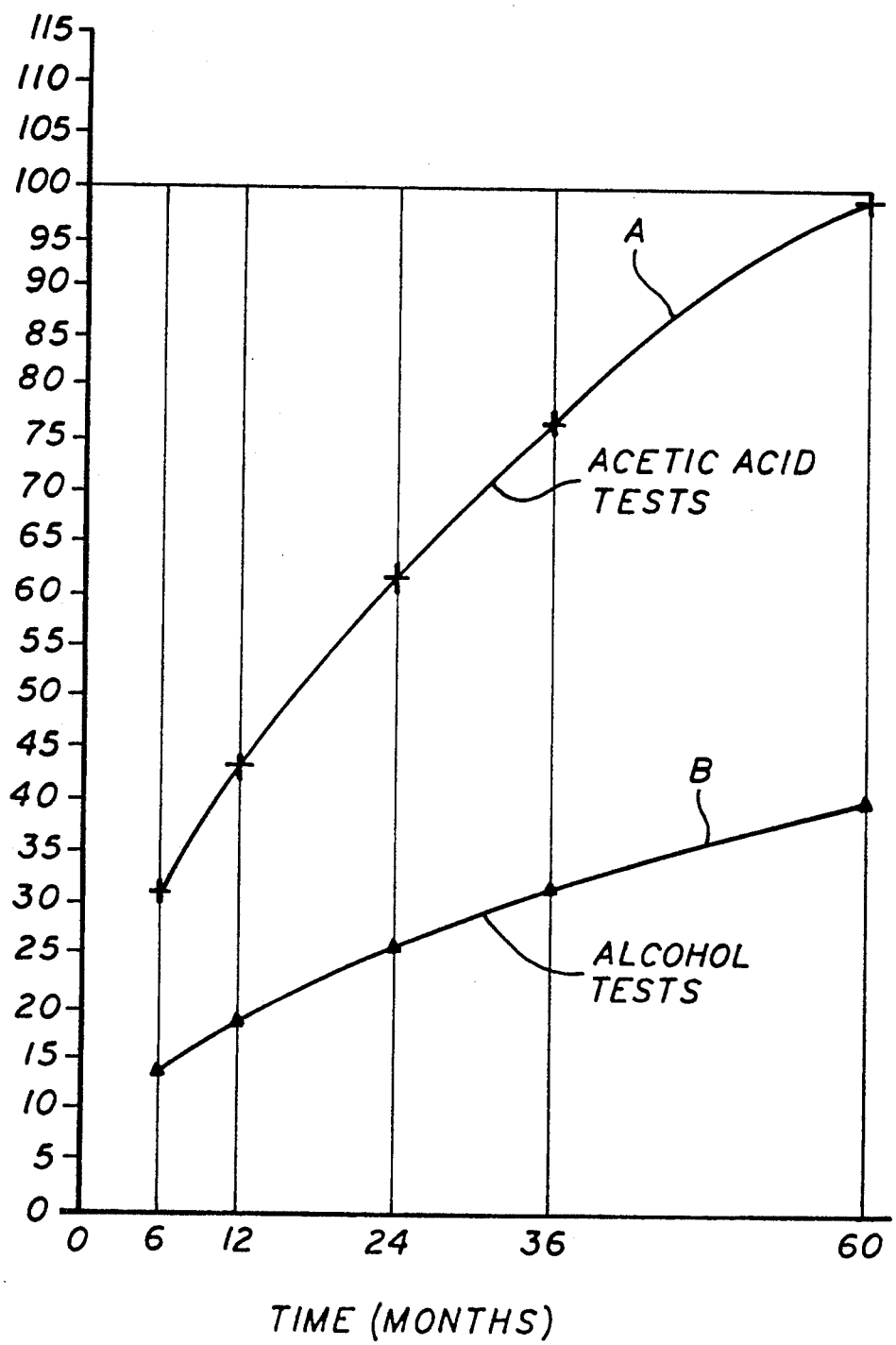
FIG. 1 is a chart comparing the increasing concentration of lead over time (up to sixty months) in solutions of 4% aqueous acetic acid (pH=2.30) or in a commercial alcohol (such as standard cognac having a pH of 3.5), which are stored in crystal flasks produced in accordance with the present invention.

The hydrolytic attack of glasses by an acid liquid can be considered as an ionic exchange between the $H^+$ ions in solution and the cations of the vitreous network, with the silica in the glass remaining practically unchanged. Such an exchange is limited to the network modifiers (alkaline and alkaline earth metals) and to some heavy metals, such as lead, cadmium and barium (to the degree they are present). Thus it has been proposed to limit the migration of lead and other heavy metals into liquids contacting an article formed of crystal or lead glass by removing the lead from a superficial thickness of an article wall by using aqueous acid solutions. Unfortunately, this requires the use of concentrated acid solutions, and has poor results. Industrial production requirements, such as safety and time obligations, make this method undesirable as is readily evident from the discussion below.

The ion exchange kinetics between the lead in the wall and the cations in a liquid contacted with a lead glass or crystal flask is governed by the second law of Fick, i.e., the amount of dissolved lead is proportional to the square root of the contact time. The diffusion coefficient is an Arrhenius function of the temperature. Therefore, the temperature has to be substantially increased to get a significant increase in the rate at which lead is leached from a container.

However, the leaching of lead from the surface of articles by use of acid solutions can only be carried out at comparatively low temperatures (i.e., at less than the boiling point of the liquid acid). Thus, the temperature can not be increased sufficiently to rapidly treat articles to meet practical industrial requirements. Further, it is unsafe to heat or boil acids, especially strongly concentrated acids. Therefore, use of the acid leaching process generally results in removal of only a small amount of lead from a container wall, so that further contact between a so treated container and an acid liquid soon results in diffusion of substantial amounts of lead into the liquid. In fact, the diffusion rate remains practically the same after acid leaching as before the acid leaching treatment, so that, at best, the acid leaching treatment results in only a small postponement of the heavy metal leaching phenomenon into a liquid stored in an article formed of lead glass or crystal. This is inadequate in view of the long storage periods frequently encountered for high quality spirits in decanters formed of crystal or lead glass. In fact, it is not uncommon for high quality spirits to be stored in crystal or lead containing glass articles for several years. Further, decanters formed of crystal or lead containing glass are also used for storing strongly acid products, such as vinegar containing preparations, which by way of non-limiting example include mustard and other acid containing sauces that have long shelf lives.

To overcome the deficiencies of the prior art, in a preferred embodiment, the surface of an article formed of a lead containing vitreous material is treated to reduce the amount of lead in the superficial thickness of the surface which will come into contact with materials stored in the container. Lead ions are removed from the surface by ion exchange between the solid article and a layer temporarily applied to the surface. In a preferred embodiment, the layer comprises a silico-aluminous crust, which is formed by heating a kaolin layer applied to the surface as a thixotropic barbotin or slip (i.e., a thin coating). It is believed that the kaolin layer, which is formed of hydrated aluminum silicate and water, exchanges $H^+$ and $Al^{3+}$ ions for lead ions in the surface of the treated lead glass or crystal. The depletion of lead ions extends into the treated glass surface to at least 20 nanometers, and generally extends into the treated glass between about 50 and about 100 nanometers (1000 Ångstroms).

In one embodiment, improved articles formed of lead glass or crystal are produced by the following steps: A. Contacting a viscous thixotropic kaolin solution with a surface or the surfaces of a lead glass or crystal article to form a thin layer of kaolin thereon. B. Heating the thus coated article at between about 300° C. and the softening temperature of the lead glass or crystal forming the article for a duration of time sufficient to exchange $Pb^{2+}$ from the surface of the article with ions other than lead in the kaolin layer. C. After cooling the thus coated and heated article, eliminating the silico-aluminous crust or baked kaolin layer from the surface of the article by washing.

The thin layer applied to the lead glass or crystal articles prior to heating is formed from a barbotin or slip, which is a thixotropic aqueous suspension of compounds, such as phyllosilicates or tectosilicates (e.g., clays, kaolins, montmorillonites, and zeolytes). In a preferred embodiment, the slip is formed of hydrated aluminum silicate, which is believed to retain water at the high temperatures at which the lead cations are exchanging with cations from the kaolin, and the exchange occurs at a sufficiently high speed to be consistent with industrial production time requirements and still produce crystal or lead flasks that will not leach unsafe levels of lead into alcohols or acidic food products stored therein.

The phenomenon of the foregoing exchange reaction may be explained as follows: The crystalline solids (articles of lead glass or crystal) are all characterized as having molecular structure arrangements in octrahedric or tetrahedric layers with an overall negative charge due to the replacement of $Si^{4+}$ by cations of lesser positive charge, such as $Al^{3+}$. The excess negative charge is compensated by other cations, mainly monovalent cations (e.g., $H^+$, and alkaline metals) and sometimes bivalent cations (e.g., alkaline earth metals). Such "compensating" cations can be exchanged with other species. The amount of negative charge so compensated by exchangeable cations is called "cationic exchange capacity" (CEC) or "base exchange capacity" (BEC).

In fact, the exchange at high temperatures between $H^+$ ions of meta-kaolin and the alkaline metal ions of sodocalcic glasses has been demonstrated, and this knowledge applied to improving the durability, as well as certain other properties (mechanical and electrical), of sodocalcic glasses. See "The Glass Industry", Vol. 26 NB6, June 1945, NB7, July 1945; NB6, June 1947. However, the requirements of the process disclosed in "The Glass Industry" articles has resulted in their abandonment.

Thus, prior studies have been limited to the exchange between the sodium of sodocalcic glasses and the $H^+$ ions of meta-kaolin. Note that an advantage of ion exchange at high temperature with kaolin over leaching at room temperature with an aqueous acid is found in the improved kinetics at the higher temperature and in the surface state after treatment.

It has been surprisingly discovered that, by use of the present invention, that only a few hours of contact is needed between a lead glass flask and a silico-aluminous (e.g., kaolin) layer (slip) at a temperature between about 300° C. and the strain point of the lead glass or crystal to diffuse significant amounts of lead from the lead glass or crystal into the slip. In fact, surface analysis by ESCA and SIMS spectrometries demonstrates a complex exchange between the $K^+$ and $Pb^{2+}$ ions of the crystal or lead glass and the $Al^{3+}$ ions of the kaolin. This exchange gives rise to the formation of a silico-aluminous diffusion barrier, of a thickness of at least 20 nanometers, generally between about 50 to about 100 nanometers (1000 Ångstroms), in the surface of crystal or lead glass treated. This silico-aluminous layer forms an interfacial barrier which opposes the inter-diffusion of $Pb^{2+}$ ions of the solid and $H^+$ ions of an acid placed in contact with the surface. It is believed that the alumina in the kaolin takes part in the formation of this highly stable superficial layer or barrier.

A silico-aluminous diffusion barrier or layer formed in accordance with the present invention persists even after a thermal treatment at 120° C. for a period of 17 hours, which corresponds to several years aging at room temperature without contact with any liquid.

In a preferred embodiment, the silico-aluminous crust (e.g., kaolin with leached lead therein) which remains on the surface of a treated article following heating is removed by water washing, followed by sand blasting or ultrasound treatment to ensure that all of the crust is removed.

Significant advantages of this process include the accuracy with which it can be used on an article. Since the slip of kaolin is thixotropic, it is easy to apply a continuous layer of the kaolin to the intimate and hard to reach areas inside of a flask. The continuous layer of kaolin leads to a continuous, thin diffusion barrier in a cemented flask. Further, the thixotropic nature will allow one to "paint" surfaces of a lead glass or glass article with kaolin or pure hydrated aluminum silicate. The required heating temperatures and duration of heat treatment needed to produce lead-leaching-safe crystal flasks in accordance with the present invention are readily satisfied by existing industrial equipment, and the process lends itself to exploitation on a widespread industrial scale.

Specific nonlimiting examples of the present invention which demonstrate the efficacy and efficiency of the inventive process follow.

EXAMPLE 1

This example illustrates the process of the invention as applied to treatment of flasks made of crystal containing 30% by weight lead (i.e., 30% lead oxide by weight). These flasks are designed to be used for cognac storage. Each flask has a capacity of 750 ml. a barbotin (slip) was prepared from a commercial kaolin sold in France by the firm of Societe LAMBERT RIVIERE under the trademark "KAOLIN HEAVY". This high purity kaolin contains the following maximum concentrations of impurities:

| calcium | 250 ppm |
|---|---|
| heavy metals | 25 ppm |
| chlorides | 250 ppm |
| sulfates | 0.1% in weight |
| acid soluble substances | 10 mg. |

The other properties of KAOLIN HEAVY meet the purity requirements of the European Pharmacopoeia of 1974.

The barbotin was prepared by intimately mixing in a mortar:

| heavy kaolin | 47 parts by weight |
|---|---|
| water | 53 parts by weight. |

The barbotin or slip obtained was then introduced into a flask and the flask shaken to ensure a uniform coating of its entire inner surface. Then the excess barbotin was drained, leaving a thin uniform coating. Due to the thixotropic properties of the barbotin, the kaolin coating remained substantially uniform in thickness, without any substantial flow due to gravity.

The thus coated flask was placed in an oven, and the temperature progressively increased to 400°–440° C. (Preferably, rapid cooling and/or heating is avoided.) The flask was then maintained at 400°–440° C. for 4 to 6 hours. After cooling the flask, the barbotin crust was removed by washing with water, which removed most of the crust. The flask was then washed with a water/sand suspension to remove the remaining traces or veil of the crust, so that the article recovered its original aesthetic appearance.

Preferably, treatment temperatures are close to but do not exceed the strain point of the crystal (440° C.), to prevent surface alteration or excessive adherence of the kaolin crust after cooling.

In a preferred embodiment, the percent by weight water in the barbotin (slip) ranges from between about 40 and about 60% by weight; the amount of water (or other liquid carrier, such as but not limited to alcohol) mixed with the kaolin to form a thixotropic slip will depend upon the specific kaolin used, its granulometry, its method of application (dipping, brushing and so on), shape of the treated article, and use of possible thixotropic additives.

DURABILITY TESTS

Flasks produced in accordance with Example 1 were filled with an aqueous 4% acetic acid solution. The lead content of the solutions were measured by atomic absorption spectrophotometry every 24 hours. Measurements were compared with measurements made upon an identical solution contained in untreated flasks formed of the same leaded glass. After 750 hours (about one month), the following results were noted.

| Flask | Pb Content of Solution |
|---|---|
| Treated (Cemented) | None detected |
| Non-treated | 1.7 mg/l. |

Thus, it is clear from this durability test that the process of the present invention is very effective in reducing the amount of lead leached from a lead glass into an acid containing solution. The kaolin layer removed between 2 and 3 mg. of lead from the lead glass during the treatment.

EXAMPLE 2

A series of tests were carried out for 6, 12, 24, 36 and 60 months (projected up to 5 years) using two different liquids: an aqueous 4% acetic acid solution (pH=2.30), and an alcohol containing solution (standard cognac at pH 3.5). Results of these tests are illustrated in FIG. 1 and are tabulated in Table I.

TABLE I

Lead content (µg/l) in Aqueous 4% Acetic Acid Solutions and Alcohol Containing Solutions Stored in Crystal Flasks (30% PbO by Weight) Treated in Accordance with the Present Invention

| Leaching Solution | Lead Content After 6 Mos. | Lead Content After 12 Mos. | Lead Content After 24 Mos. |
|---|---|---|---|
| Acetic Acid | 31.0 | 43.8 | 62.0 |
| Alcohol | 13 | 18.3 | 25.9 |

| Leaching Solution | Lead Content After 36 Mos. | Lead Content After 5 Years |
|---|---|---|
| Acetic Acid | 76 | 98 |
| Alcohol | 31.6 | 40 |

The results of Table I are illustrated graphically in FIG. 1, with the upper line, labelled A, indicating the lead content over time for the acetic acid solutions, while the lower line, labelled B, represents the lead content over time for alcohol solutions stored in treated flasks. Evaluating the results of the foregoing tests, it is noted that the five Year tests are almost superfluous. The actual age of an alcohol such as cognac, which is often mentioned on the decanter in which it is normally sold, does not mean that the alcohol has been kept in the actual crystal or lead glass flask in which it is sold during its aging. Aging of cognacs or other fine liqueurs usually occurs in carboys or casks (generally oak casks). Lead glass flasks are usually only filled when the alcohol is ready for offering to the public. Thus, the effective contact time between the alcohol and the crystal or lead glass flask is only the time required to put the flask on display in a retail shop, as well as the customer's consumption time, which generally should be, at most, 2 to 3 years. For the foregoing reasons, the above tests were conducted in real time for 12 months, with artificial aging to obtain the 36 month figures, and the five year figures were extrapolated in accordance with the law of Fick (which is generally admitted in the field of ion migration speed, and computed in terms of the square root of time).

It is also noted that the lead amounts leached into the solutions are substantially lower for alcohol than for acetic acid. This is believed to be due to the higher pH of the alcohol solutions used, and the presence of further components present in alcoholic beverages such as cognac.

Further, it is of utmost importance to observe that the highest lead content achieved by the alcohol after five years is only 40μg/l. This is less than half of the amount of lead allowed by the strictest regulations to date.

It can therefore be said that by use of the process of the present invention, a flask subjected to the most extreme conditions can be guaranteed to meet the most demanding legal requirements for lead leaching into a solution contained therein.

It is to be understood that the present invention is not to be limited by any theory or hypothetical explanation. Hypotheses for explaining the efficiency and effectiveness of the process include:

A. A simple $H^+/Pb^{2+}$ ion exchange between crystal and kaolin coated thereon. Depletion of lead in the superficial layers of the crystal minimizes the later migration of lead into a liquid contacting the crystal.

B. A complex exchange of cations in the crystal and in the kaolin coating, which generates formation of a silico-aluminous diffusion barrier which opposes subsequent migration of lead still present in the lead glass or crystal.

It is highly possible that both explanations A. and B. above occur, perhaps along with further reactions. For example, during the initial stages of treatment, $Pb^{2+}$ ions would drift into the kaolin, a first favorable result, which is followed by initiation and development of a silico-aluminous diffusion barrier which opposes any further subsequent migration of lead remaining in the crystal.

An additional benefit of the present invention is that the silico-aluminous diffusion barrier formed in the flask is thin enough not to interfere with the aesthetic beauty of the crystal or lead glass articles, yet is effective in minimizing or reducing the migration of lead into solutions placed in contact with the flask so that the flask can be utilized commercially or in the home for storage of high value products such as spirits and foods.

The above experiments were performed with a crystal flask having a lead content of about 30% lead oxide by weight. However, it is noted that flasks containing lesser amounts of lead can also be treated using the process with the same desirable result of reduced lead leaching. For example, certain manufacturers may add only small quantities of lead to glass containers in order to designate the glass as "lead glass." Although glass containing only a small percent of lead oxide (e.g., less than 12%) will not have the same refractive index and aesthetic appearance of crystal or high lead glass (e.g., about 24% or greater lead oxide by weight), it is helpful in marketing to have the designation "lead glass" included on packaging. It is also to be understood that the process can be effectively used on crystal containing a very high percentage of lead oxide by weight; for example, the process can be used on crystal flasks containing 40% or higher lead oxide. In a preferred embodiment, flasks produced in accordance with the present invention contain between 12% and up to 40% lead oxide by weight, preferably between about 12% and about 35%. The process is particularly useful in producing lead glass articles containing between about 24% and about 35% lead oxide by weight (classified as crystal to crystal superior) which will not leach dangerous quantities of lead into alcoholic beverages or foods stored therein.

EXAMPLE 3

Flasks formed of glass containing approximately 25, 35 and 40% by weight lead oxide were coated with a kaolin slip as disclosed in Example 1. The flasks, initially at room temperature, were then exposed to gradually increasing temperatures which achieved 440° C. after 3 hours; the flasks were kept at 440° C. for an additional 5 hours, and cooled to ambient temperature over a period of 3 hours. A chemical analysis of the major constituents of the flasks used in these experiments is provided below (obtained by atomic absorption spectrophotometry):

TABLE II

Constituents of Flasks Utilized in Experiment 3

| Constituent | Weight Percent of Constituent in Flasks | | | |
|---|---|---|---|---|
| | A | B | C | D |
| $SiO_2$ | 59.8 | 56.5 | 52.4 | 46.8 |
| $K_2O$ | 9.7 | 12.7 | 11.0 | 11.0 |
| $Na_2O$ | 3.6 | — | 0.8 | 0.8 |
| PbO | 25.3 | 30.6 | 34.8 | 40.0 |
| CaO | — | — | 0.5 | 0.5 |
| $Al_2O_3$ | — | — | 0.2 | 0.2 |
| $B_2O_3$ | — | — | 0.5 | 0.5 |
| $As_2O_3$ | — | — | 0.8 | 0.8 |
| Total | 98.4 | 99.8 | 99.7 | 99.3 |
| Transition Temperature $T_g$ | 456° C. | 461° C. | 458° C. | 452° C. |

At least 3 flasks or decanters from each of categories A–D (i.e., 25%, 30%, 35%, and 40% by weight lead oxide) were subjected to the following leaching analysis studies.

Lead glass flasks were contacted with 4% acetic acid at 50° C. in order to accelerate the migration of lead into the acid solution. With reference to FIG. 2, the lead migration into a 4% acetic acid solution stored in cemented flasks at 50° C. is illustrated by comparison of the concentration of lead (μg/l) versus contact time in hours. It is clear from FIG. 2 that increasing lead migration is directly related to increased contact time of the acetic acid solution with the treated lead glass flasks, and is also directly related to the percent by weight of lead oxide in the initial flask. Results in FIG. 2 also clearly show that the process will work for flasks formed of lead glass containing anywhere from less than 1% lead oxide up to at least 40% by weight lead oxide. Of particular significance is that lead oxide concentrations in the acetic acid solutions are below 16 micrograms per liter after 800 hours of contact for crystal flasks treated in accordance with the present invention which have an initial lead oxide percent of less then or equal to 35%. Diffusion of lead into acetic acid solutions accelerates abruptly for lead glass containers containing more than 40% lead oxide by weight (55 micrograms per liter after 800 hours), but the diffusion remains far below the values obtained with noncemented flasks even for a crystal flask containing 40% lead oxide. For example, analysis of a 4% acetic acid solution stored in an untreated crystal flask having 30% by weight lead oxide resulted in a concentration of 7,000 micrograms per liter lead after 448 hours at 50° C.

With reference to FIG. 3, the concentration of lead in a 4% acetic acid solution is projected over times up to 10 years versus the lead oxide content in the crystal flask in which the acid is stored. After 10 years, a crystal flask containing 35% by weight lead oxide, when treated in accordance with the present invention, leaches only about 20 micrograms per liter lead into the acetic acid solution while a flask containing 40% lead oxide by weight, when treated in accordance with the present invention, after 10 years will leach about 80 micrograms per liter of lead into a 4% acetic acid solution. Note that the acetic acid solution used for these experiments is much more aggressive than the alcohols and spirits which would normally be contained in such flasks. The experimental data available indicates that acetic acid leaches lead 4 times faster than alcohols and spirits.

It is noted that the maximum permissible concentration for lead in drinking water is 50 micrograms per liter. The experiments above utilized a 4% acetic acid solution at 20° and 50° C. Further experiments at 75° C. were also conducted to verify the above results. It is clear that the long periods of time for these acetic acid solutions to reach 50 micrograms per liter, more than 10 years in the case of a crystal containing 35% by weight lead oxide, indicates that the time necessary for alcoholic beverages stored inside of flasks treated in accordance with the present invention to achieve lead concentrations above the maximum permissible limit for drinking water will be decades.

EXAMPLE 4

Studies were conducted on the migration of elements in cemented crystal glass articles by secondary ion mass spectrometry (SIMS). A secondary ion mass spectrometer allows the concentration of elements, such as silicon, potassium, lead, aluminum and hydrogen, to be measured at varying depths in the glass. Preliminary studies demonstrated that, in a crystal flask cemented in accordance with the present invention, lead concentrations in the superficial layers are reduced, aluminum concentrations increase at the surface, but this concentration varies in time when in contact with an acid, and the superficial hydrogen content increases. A systematic analysis of the concentrations of various elements over time in cemented lead glass flasks was conducted and confirmed the results of the preliminary study.

Sample Preparation

Twenty-five samples, taken from the same lead glass, were subjected to various surface treatments and varying experimental conditions (the lead glass contained approximately 28% by weight lead oxide). Lead glass samples were cemented at 300° C. or 460° C. Certain samples were annealed at 480° C. Cemented samples were also exposed to acid or alkaline media for periods of time ranging between 72 and 812 hours. Leaching temperatures were 50° or 75° C.

Ion spectrometry is used to analyze the chemical or isotopic composition of a solid sample by exposing it to a beam of primary ions. The ion beam evaporates the sample at the point of impact, releasing secondary ions from the sample. These secondary ions are then analyzed to determine the composition of the sample. By continuously analyzing the ions released as the beam penetrates a sample, the concentration of an element at varying depths of a sample can be determined.

Experimental Equipment and Method

A Cameca IMS 3f ionic mass spectrometer was used. The glass samples were approximately 1 centimeter in size and had been subjected to the various treatments described above. Samples were isolated using the procedure described by Metson et. al. ("Suppression Of Molecular Ions In The Secondary Ion Mass Spectra Of Minerals," *Surf. Interf. Anal.* 5, 181–185 (1988)). All concentration profiles were measured under similar conditions, using a 4 nA $O^-$ primary beam focused on 10 mm and scanning $50 \times 50$ mm for 40 minutes. The masses of the elements measured were taken as 1 for H, 27 for Al, 28 for Si, 39 for K, and 206 and 208 for Pb. The count time was 3 seconds for each mass and the count for each of these 6 elements was cyclically repeated throughout the analysis. The crystal glass erosion rate was estimated by comparison with known values for silicates with a similar density. Data obtained from the various samples was digitally processed using a double-standardization process described by Muir et. al. ("Characteristics Of Altered Labradorite Surfaces By SIMS and XPS," *Geochem. Cosmochem. Acta,* 53, 1235, 1241 (1989)).

Results for SIMS depth profiles for lead, aluminum, hydrogen and potassium follow:

Lead: The SIMS data indicates that cementation of lead glass modifies the lead concentration profiles so that the lead concentration ranges from approximately 28% at a depth of 1000 Ångstroms to about 5% just beneath the surface (100 Ångstroms). There was little difference in the lead concentration profiles by using a cementation temperature of 300° C. or 460° C. Likewise, annealing had little effect on the lead concentration profiles.

Aluminum: The $Al_2O_3$ concentration increases from 4 to 6% at the surface and decreases back down to a concentration of 4% at a depth of approximately 500 Ångstroms. Annealing tends to redistribute the $Al_2O_3$ deeper into the crystal.

Hydrogen: Hydrogen behaves in a similar manner to $Al_2O_3$. The concentration is increased by approximately 0.4% at the surface (expressed as $H_2O$ by weight) and progressively reduces over 1000 Ångstroms to the basic value. Annealing redistributes protons deeper into the glass.

Potassium: After cementation, the concentration of potassium reduces from 14% at 1500 Ångstroms to 8% at the surface.

In summary, the ion spectrometer profiles obtained from the samples illustrate that application of the cementation process to lead containing glass reduces the lead and potassium content and increases the aluminum and hydrogen content in the surface and superficial depths of the glass. The effect of the cementation results in a reduction in the lead concentration on the surface and superficial areas of the glass to a depth of about 1000 Ångstroms.

SIMS profiles on cemented samples contacted with an acid medium show that contact with an acid medium (4% acetic acid at 75° C.) has relatively little effect on the profile of lead concentration in glass cemented at 460° C. Lead levels drop slightly after 600 hours leaching, showing a slight diffusion of lead towards the outside or surface of the crystal, without any major change in the composition of the superficial layers. Samples cemented at 300° C. were also stable for contact periods with 4% acetic acid up to 200 hours. A profile obtained after 600 hours exposure to an acid medium showed a considerable reduction in lead concentration in the outer layers (between 200 and 1000 Ångstroms), accompanied by a significant change in the deeper profile. Therefore, it is clear that preferred results are achieved by use of temperatures above 300° C., but below the strain point of the glass. Annealing of the cemented samples seem to have little effect either on the initial lead concentration profile or on its resistance to acid, although annealing appears to be beneficial to decreasing leaching of lead as discussed below.

The SIMS analysis indicates that contact with an acid medium as above progressively leaches aluminum from glass cemented at 460° C. or 300° C. This leaching occurs progressively, but the increase in aluminum content caused by cementation disappears completely after 200 hours. In samples cemented at 300° C., lead begins diffusing into the acid solution at the same time as the alumina is dissolved, but this is not true for samples cemented at 460° C. In samples cemented at 460° C., even though the aluminum has been completely leached after 200 hours of exposure to 4% acetic acid at 75° C., no significant diffusion of lead occurs even after 600 hours of exposure to the acid.

Hydrogen concentrations in cemented flasks were found to decrease over long-exposure experiments with 4% acetic acid at 75° C. Annealing increases the hydrogen concentration at the glass surface, and particularly at depths up to 1000 Ångstroms. Consequently, the hydrogen concentration decreases less quickly under the effect of acid for annealed samples than for non-annealed samples.

Alkaline solutions dissolve the superficial layers of the glass. Silicon is preferentially dissolved from the glass, thereby causing a corresponding increase in the concentration of the other elements left behind in the glass; alkaline solutions cause the lead concentration at the surface of the cemented lead glass flask to increase between 5 to 15%.

The proceeding experiments lead to the conclusion that the cementation process of the present invention decreases the lead concentration in the surface of a lead glass to a depth of up to approximately 1000 Ångstroms, and inhibits lead migration during subsequent contact with an acid medium.

While preferred embodiments of the present invention have been disclosed herein, it is to be understood that the invention can be practiced other than as specifically described.

I claim:

1. A process for treating the surface of an article made of a lead containing glass, comprising the step of forming a silico-aluminous layer in at least one surface of said article, wherein said silico-aluminous layer reduces, in comparison to said glass without said layer, migration of lead ions from said glass into a liquid placed in contact with said surface having said silico-aluminous layer, said liquid being capable of solubilizing lead from said glass, wherein the step of forming said silico-aluminous layer comprises the steps of:
   (a) applying to at least one surface of said article a thixotropic slip capable of exchanging lead ions in said glass with ions other than lead in said slip; and
   (b) heating said article with said slip thereon to a temperature and for a period of time sufficient to exchange at least a portion of said lead ions in said glass with ions other than lead in said slip.

2. The process of claim 1, wherein said temperature is between about 300° C. and up to about but below the strain point of said glass, and said period of time is between about 3 hours and about 6 hours.

3. The process of claim 1, wherein said slip is formed from a thixotropic suspension of hydrated aluminum silicate.

4. The process of claim 3, wherein said temperature is about 400° C. to about 440° C., and said period of time ranges from about 3 hours to about 6 hours.

5. The process of claim 1, wherein said slip comprises kaolin.

6. The process of claim 1, wherein said slip is applied by filling said article with a thixotropic aqueous suspension of hydrated aluminum silicate, and emptying said article, wherein at least a portion of said thixotropic suspension adheres to the interior surface of said article to create said slip.

7. The process of claim 6, further comprising the steps of:
   (c) cooling said article having said slip thereon after said heating step; and
   (d) removing the silico-aluminous lead containing crust formed from said slip as a result of said heating step, said removing step being performed by at least one of the methods selected from the group consisting of:
   washing with a solution comprising water;
   sand blasting; and
   ultra-sound treatment.

8. The process of claim 1, wherein said glass comprises at least about 12% by weight lead oxide.

9. The process of claim 1, wherein said glass comprises between about 24% and 35% by weight lead oxide.

10. The process of claim 1, wherein said silico-aluminous layer has a thickness of at least 20 nanometers.

11. The process of claim 1, wherein said silico-aluminous layer has a thickness of about 100 nanometers.

12. A process for removing lead from the surface of an article made of a lead containing glass, comprising contacting said article with a thixotropic slip capable of exchanging lead ions in said glass with ions other than lead from said slip; and
heating said article with said slip thereon to a temperature between 300° C. and the strain temperature of said glass for a period of time sufficient to exchange at least a portion of said lead in said glass with said ions other than lead in said slip.

13. The process of claim 12, wherein said slip is formed from a thixotropic aqueous suspension of hydrated aluminum silicate.

14. The process according to claim 1, wherein said slip comprises kaolin.

15. The process of claim 1, wherein said article having said slip thereon is heated at progressively elevated temperatures of up to about 400° C. to about 440° C. for periods of time ranging from about 4 hours to about 6 hours.

* * * * *

UNITED STATES PATENT AND TRADEMARK OFFICE
CERTIFICATE OF CORRECTION

PATENT NO. : 5,308,652

DATED : May 3, 1994

INVENTOR(S) : Gerard Cornier

It is certified that error appears in the above-identified patent and that said Letters Patent is hereby corrected as shown below:

In Column 1, line 9, insert --,-- after "1991";

In Column 3, line 26, change "flack" to --flask--;

In Column 3, line 53, insert --"-- after "flasks";

In Column 6, line 11, insert --FIG. 2 compares the migration of lead into a-- before "solutions of 4% acetic acid".

Signed and Sealed this

Thirtieth Day of January, 1996

Attest:

BRUCE LEHMAN

Attesting Officer

Commissioner of Patents and Trademarks